United States Patent
Lorenz et al.

(10) Patent No.: US 7,299,289 B1
(45) Date of Patent: Nov. 20, 2007

(54) METHOD, SYSTEM, AND ARTICLE OF MANUFACTURE FOR INTEGRATING STREAMING CONTENT AND A REAL TIME INTERACTIVE DYNAMIC USER INTERFACE OVER A NETWORK

(75) Inventors: Michael Lorenz, Manhattan Beach, CA (US); Michael Newman, Manhattan Beach, CA (US); Jereme Pitts, Manhattan Beach, CA (US); Seth Gilman, Los Angeles, CA (US)

(73) Assignee: Accordent Technologies, Inc., El Segundo, CA (US)

( * ) Notice: Subject to any disclaimer, the term of this patent is extended or adjusted under 35 U.S.C. 154(b) by 0 days.

(21) Appl. No.: 09/560,821

(22) Filed: Apr. 28, 2000

(51) Int. Cl.
*G06F 15/16* (2006.01)
(52) U.S. Cl. ........................... 709/231; 709/245
(58) Field of Classification Search ............... 709/231, 709/222, 218–219, 245; 719/311, 330; 715/749
See application file for complete search history.

(56) References Cited

U.S. PATENT DOCUMENTS

| | | | | |
|---|---|---|---|---|
| 6,006,265 A * | 12/1999 | Rangan et al. | ............... | 709/226 |
| 6,061,738 A * | 5/2000 | Osaku et al. | ............... | 709/245 |
| 6,125,402 A * | 9/2000 | Nagarajayya et al. | ........ | 709/330 |
| 6,205,485 B1 * | 3/2001 | Kikinis | ........................ | 709/231 |
| 6,389,463 B2 * | 5/2002 | Bolas et al. | ................ | 709/219 |
| 6,434,535 B1 * | 8/2002 | Kupka et al. | ................ | 705/24 |
| 6,477,550 B1 * | 11/2002 | Balasubramaniam et al. | .... | 715/513 |
| 6,487,663 B1 * | 11/2002 | Jaisimha et al. | ............ | 713/193 |
| 6,489,954 B1 * | 12/2002 | Powlette | ..................... | 345/733 |
| 6,553,410 B2 * | 4/2003 | Kikinis | ........................ | 709/218 |
| 6,557,042 B1 * | 4/2003 | He et al. | ..................... | 709/231 |
| 6,560,651 B2 * | 5/2003 | Katz et al. | .................. | 709/229 |
| 6,622,171 B2 * | 9/2003 | Gupta et al. | ................ | 709/231 |
| 6,708,217 B1 * | 3/2004 | Colson et al. | ............. | 709/231 |
| 6,711,622 B1 * | 3/2004 | Fuller et al. | ................ | 709/231 |
| 6,751,776 B1 * | 6/2004 | Gong | ...................... | 715/500.1 |
| 6,789,123 B2 * | 9/2004 | Li et al. | ..................... | 709/231 |
| 6,931,600 B1 * | 8/2005 | Pittman | ...................... | 715/767 |

OTHER PUBLICATIONS

Gralla, Preston, "How the Internet Works", Ziff-Davis Press, 1997, pp. 196-197.*

* cited by examiner

*Primary Examiner*—Andrew Caldwell
*Assistant Examiner*—Douglas Blair
(74) *Attorney, Agent, or Firm*—Venable LLP

(57) ABSTRACT

A method and system is provided which allows for integrating streaming content and a real time interactive dynamic user interface on a network, such as the Internet. The system includes a web browser for receiving a user interface from a content server. The user interface, among other functions, detects an embedded code in a media file from a streaming content server. Based on the embedded code, the user interface spawns a Common Gateway Interface (CGI) process which retrieves information from a data store. The information in the data store may include rules for altering the displayed user interface. The system and method results in an interactive user interface which may be easily modified by altering the contents of the data store rather than altering and reindexing the media file.

20 Claims, 7 Drawing Sheets

METHOD, SYSTEM, AND ARTICLE OF MANUFACTURE FOR INTEGRATING STREAMING CONTENT AND A REAL TIME INTERACTIVE DYNAMIC USER INTERFACE OVER A NETWORK

FIELD OF THE INVENTION

The present invention relates, in general, to information systems and, in particular, to facilitating a real time dynamic user interface within interactive streaming content over a network.

BACKGROUND OF THE INVENTION

As the developments of networked processing systems, such as the Internet, continue to advance more computing power and features are available to users. For example, information that historically has been limited to TV and Radio broadcasts on home appliances is now being made available through on-line computing services. The combination of networked computers and multimedia interactive graphic user interfaces permits the access and display of textual and graphic information in a manner, and at a speed, not previously known in the industry.

As a result of these advancements in technology, various streaming content application solutions now exist to facilitate the transfer of streaming content over the Internet, such as Microsoft's Windows Media Technologies available from Microsoft Corporation located at Redmond, Wash. and Real Network's Streaming Media Solutions available from Real Networks located at Seattle, Wash.

While these solutions have made streaming media content possible, they are neither designed to, nor sufficient to, support a real time interactive dynamic user interface. For example in the prior art, universal resource locator (URL) commands are used in combination with streaming media to change the user interface in a browser. For example, a media file containing a song may be downloaded or streamed to a user and at the end of media file, a URL command may be included to direct the browser to a site to purchase the song. These systems use static commands or URLs in the encoded content stream that need to be indexed prior to delivery to the displayed user interface. It is necessary to index streaming media every time a modification is made to a non-streaming element of video or audio. As a result, the displayed user interface is neither dynamic nor real time and cannot be modified "on the fly" to incorporate new high resolution images or DHTML. This requirement of indexing a static command with streaming video limits flexibility. For example, if information, such as a price or image, is changed often, the media file must be constantly reindexed. Thus, an e-commerce site may have to constantly index a media file.

Therefore, there is a desire for a method, system and article of manufacture for integrating streaming content and a real time interactive dynamic user interface on a processing device network.

SUMMARY OF THE INVENTION

In an embodiment of the present invention, a method, system and article of manufacture synchronizes streaming video, high-resolution images, text and DHTML in a user interface. The user interface can detect an embedded code in a media file being downloaded which will allow for dynamically changing information, such as images and DHTML, without requiring timely re-encoding and reindexing of the media file. The displayed user interface may be updated with new information, such as new high resolution images and/or DHTML, by accessing the new information in a database responsive to the embedded code.

According to an embodiment of the present invention, the system includes: a) a media server utilizing media streaming technology for providing video stored in a media file; b) a user interface which may utilize DHTML, JavaScript, and VBScript and is displayed by a browser; and c) a Common Gateway Interface ("CGI") accessible from a content server used to call objects stored in a database. The objects may contain rules for transferring information, such as a new high resolution image or price to the displayed user interface.

The media file and embedded time code is indexed once, yet the displayed user interface can be modified "on the fly" to accommodate new DHTML and high resolution images, among other information, without requiring reindexing. The images and rules in an object stored in a database can be changed in real time allowing for a modified displayed user interface without requiring reindexing of the media file.

According to an aspect of the present invention, a method for obtaining streaming content from a processing device network is provided. The method comprises a step of requesting an interface program from a first processing device in the processing device network. The interface program is downloaded to a second processing device in the processing device network. A user interface is displayed on the second processing device. The interface program requests a media file from a third processing device in the processing device network. The media file, including an embedded code, is then downloaded to the second processing device. The interface program spawns a process responsive to the embedded code. The embedded code is parsed into a plurality of code segments by the process. A memory location in a data store is queried responsive to the embedded code segment. The second processing device responds to the rules in the memory location.

According to an aspect of the present invention, the rules include updating the displayed user interface with a high resolution image stored in the data store.

According to another embodiment of the present invention, the first processing device and the second processing device are different processing devices.

According to another aspect of the present invention, the second processing device is a personal computer having a web browser.

According to another aspect of the present invention, the second processing device is a set-top box coupled to a television.

According to another aspect of the present invention, the media file is an advanced streaming format (".ASF") file or a real network media (".RN") file.

According to another embodiment of the present invention, the displayed user interface includes a first window, a second window and a third window. Video is provided in the first window; a high resolution image is provided in the second window; and text is provided in the third window.

According to another embodiment of the present invention, the third processing device is a media server.

According to another embodiment of the present invention, the process is a common gateway interface ("CGI") process.

According to another embodiment of the present invention, the embedded code is a metadata time code.

According to another embodiment of the present invention, the responding step includes updating the user interface display with a high resolution image stored in the data store.

According to another embodiment of the present invention, a system for providing streaming content and a real time interactive dynamic user interface is provided. The system includes a first processing device having a web browser and a data store for storing information. A second processing device is coupled to the first processing device and the data store. The second processing device provides the first processing device with (1) a user interface and (2) a media file having an embedded code. The user interface detects the embedded code during a media file download to the first processing device. The second processing device creates a process for retrieving the information from the data store which is used to alter a displayed user interface.

According to another aspect of the present invention, the first and second processing devices are computers.

According to another aspect of the present invention, the data store is a disk drive.

According to another aspect of the present invention, the embedded code is a metadata time code.

According to another aspect of the present invention, the first processing device and the second processing device is coupled to the Internet.

According to another aspect of the present invention, the first processing device and the second processing device are coupled to an intranet.

According to still another aspect of the present invention, an article of manufacture including a computer readable memory is provided. The article of manufacture includes a first software program for providing content to a client. A second software program provides streaming media to a client. A third software program detects an embedded code in the streaming media. And a fourth software program accesses a data store responsive to the embedded code.

According to still another aspect of the present invention, the data store includes a software object having rules and the rules are used to update a user interface.

Other aspects and advantages of the present invention can be seen upon review of the figures, the detailed description, and the claims which follow. In the figures, like reference numerals indicate like components.

DETAILED DESCRIPTION

Figure 1:
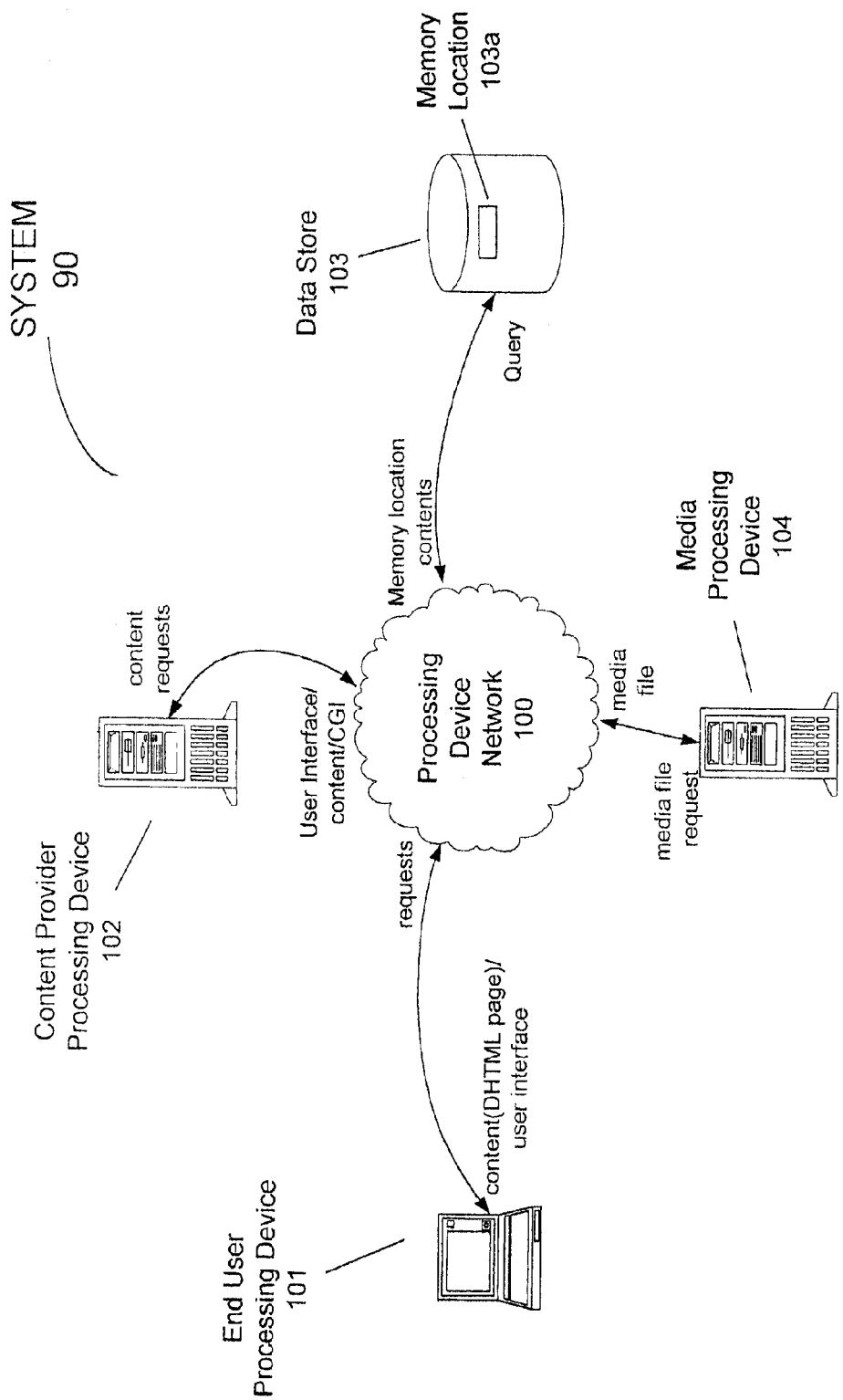
FIG. 1 is a high-level hardware block diagram of an embodiment of the present invention and illustrates the interaction between the end user processing device, content provider processing device, media processing device, and data store.

FIG. 1 illustrates a high level block diagram of system 90 according to an embodiment of the present invention. System 90 includes end user processing device 101, content provider processing device 102, data store 103, and media processing device 104, which are coupled to processing device network 100.

Processing device network 100 may include both wired and wireless connections, either singly or in a combination thereof. In an embodiment of the present invention, the processing device network 100 is the Internet (a.k.a. the world wide web). In alternate embodiments of the present invention, processing device network 100 is a cellular network, a television network, or an intranet, singly or in a combination thereof.

Processing devices illustrated in FIG. 1 may include, but are not limited to, computers, information appliances, cellular telephones, digital cameras, printers, copiers, facsimile machines, television set-top boxes, personal digital assistants, or equivalents thereof.

In an exemplary embodiment, processing device 102 is a Dell® Dimensions® XPS B series desktop computer (Dell Computer Company, Round Rock, Tex.) having typical software and hardware components as known by one of ordinary skill in the art. For example, processing device 102 includes a central processing unit, persistent storage, I/O devices including a display and keyboard, a network interface and an operating system.

Software in processing devices of FIG. 1 may be stored in a computer readable medium such as read-only memory ("ROM"), random access memory ("RAM"), virtual memory or other memory technologies, singly or in combination thereof.

In an embodiment, data store 103 is computer readable memory, such as a magnetic hard disk drive, floppy disk, optical disk, or other read-write data storage technologies, singly or in combination thereof.

Figure 2:
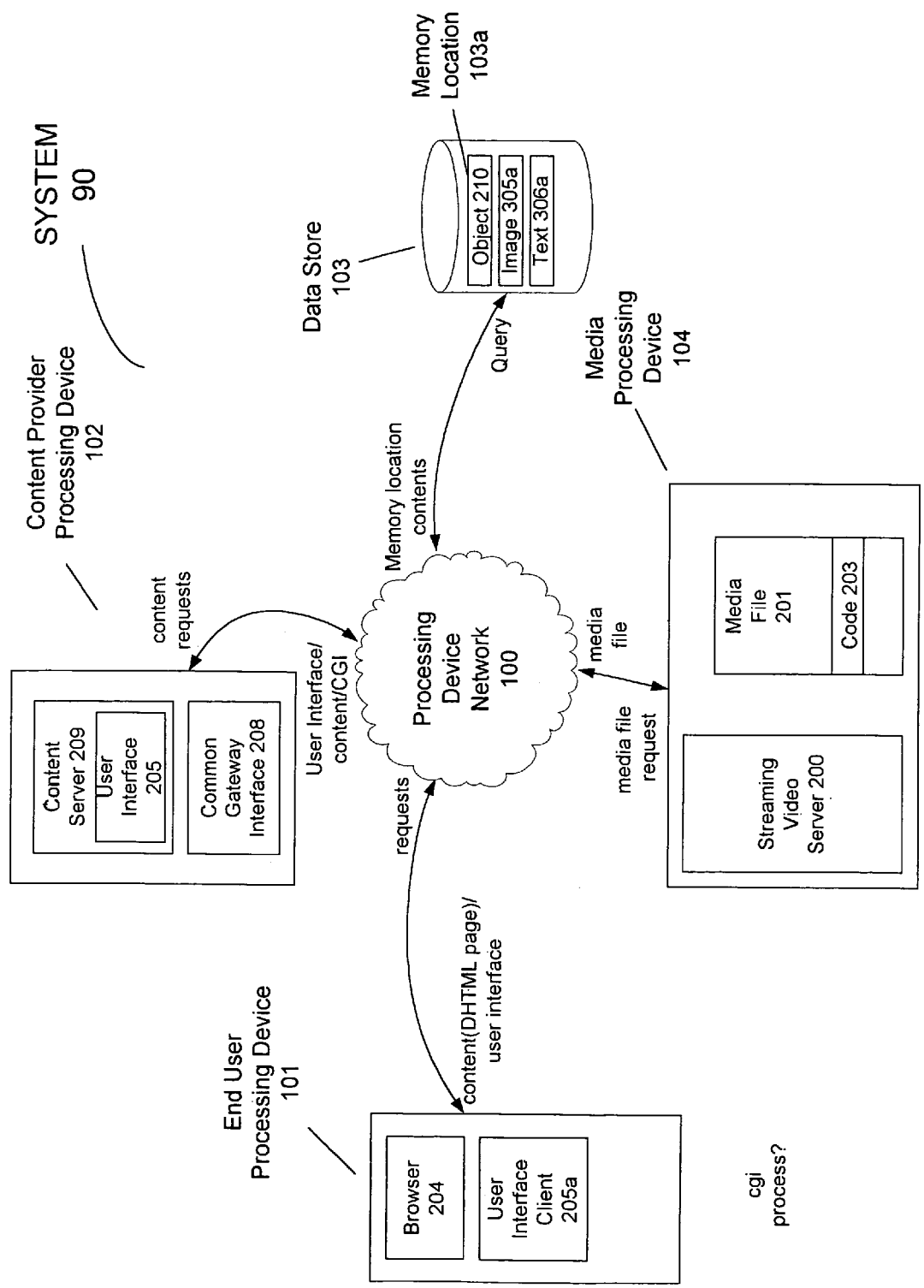
FIG. 2 is a high level software block diagram of an embodiment of the present invention showing the interaction between the end user processing device, content provider processing device, media processing device, and data store.

FIG. 2 illustrates a high level software block diagram of system 90 illustrated in FIG. 1. In an embodiment of the present invention, end user processing device 101 stores browser 204 and user interface client 205a in memory. In an embodiment of the present invention, browser 204 is Internet Explorer 5.00 available from Microsoft Corporation located at Redmond, Wash.

In an embodiment of the present invention, software components such as CGI interface 208 and user interface 205 are stored on a computer readable medium.

Content provider processing device 102 includes multiple software programs. In an embodiment of the present invention, Common Gateway Interface ("CGI") software 208 is stored in memory of processing device 102. In an embodiment, CGI software 208 includes at least one CGI process. CGI software allows scripts or programs to run on processing device 102. Typically, CGI scripts are implemented to control users interactions with a web site. Similarly, processing device 102 includes content server 209 and user interface 205. A server is a software program that provides service or content to users accessing processing device 102 through network 100. In addition, user interface 205 provides user interface client 205a to processing device 101.

Data store 103 as described above is coupled to processing device network 100. In an embodiment of the present invention, data store 103 includes a relational database which is accessed by a structured query language ("SQL"). Data store 103 includes a memory location 103a. In an embodiment of the present invention, object 210 is stored at memory location 103a and may include rules which will be discussed below. Further, data store 103 may also include high resolution images digitally represented by Graphical Interface Format ("GIF") files and/or Joint Photographic Experts Group ("JPEG") files. In an alternate embodiment, other multimedia file formats may be stored.

Media processing device 104 stores streaming video server 200 and media file 201 in memory. Media file 201 includes an embedded metadata time code 203.

In an alternate embodiment of the present invention, streaming video server 200 and media file 201 are stored in memory on content provider processing device 102.

In an alternate embodiment, data store 103 is coupled to content processing device 102.

When an end user desires to access information available on processing device network 100, such as the Internet, the user initiates a connection through web browser 204. Web browser 204 then may request user interface client 205a from content provider processing device 102. In an embodiment of the present invention, this may be accomplished by entering into browser 204 a universal resource locator ("URL") address of the web site provided by content server 209. A user then may download the user interface client 205a from the web site. The connection from processing device 101 to processing device network 100 may be established through an Internet service provider ("ISP"). The ISP is a service that allows an end user to connect to processing device network 100 usually through a modem.

Figure 3:
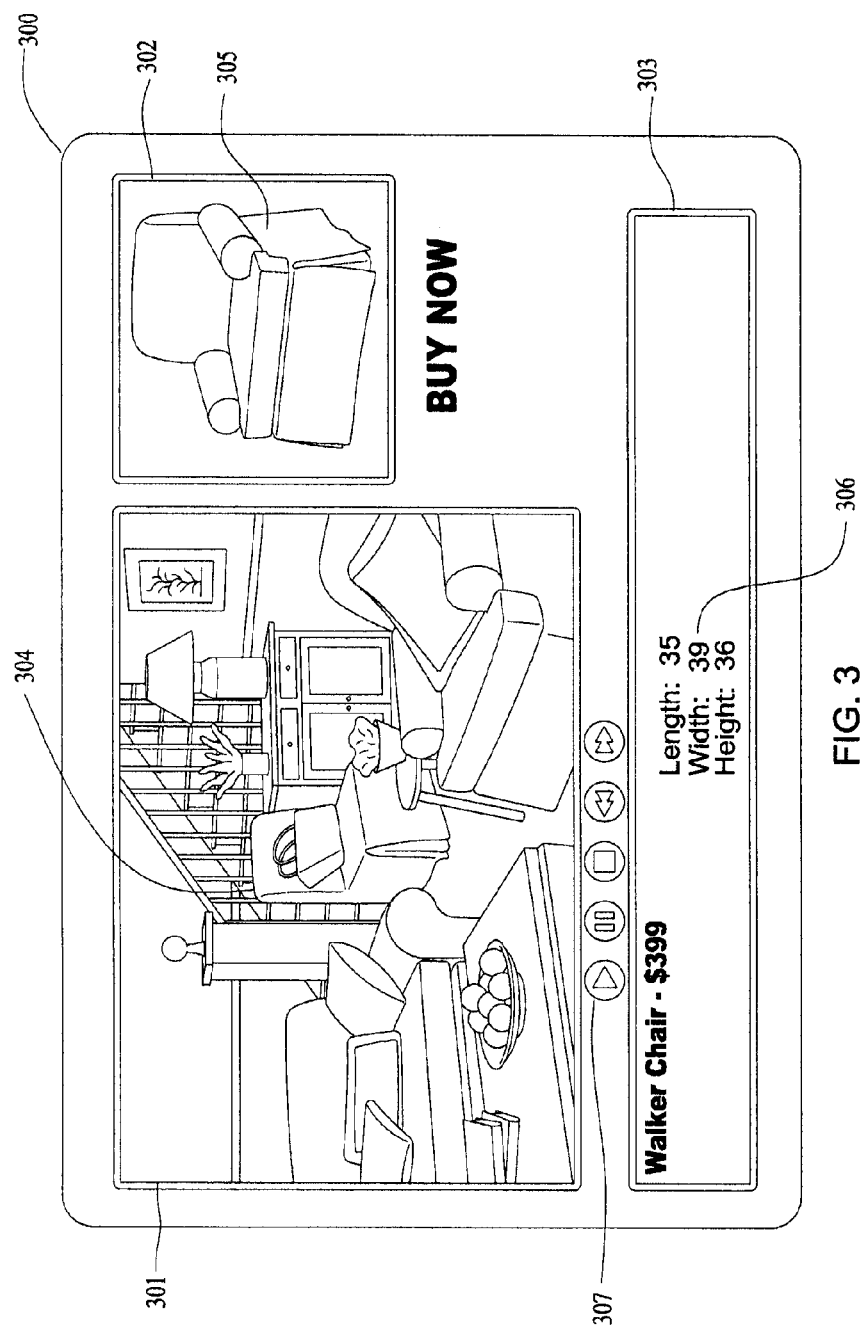
FIG. 3 illustrates a displayed user interface according to an embodiment of the present invention.
Figure 4:
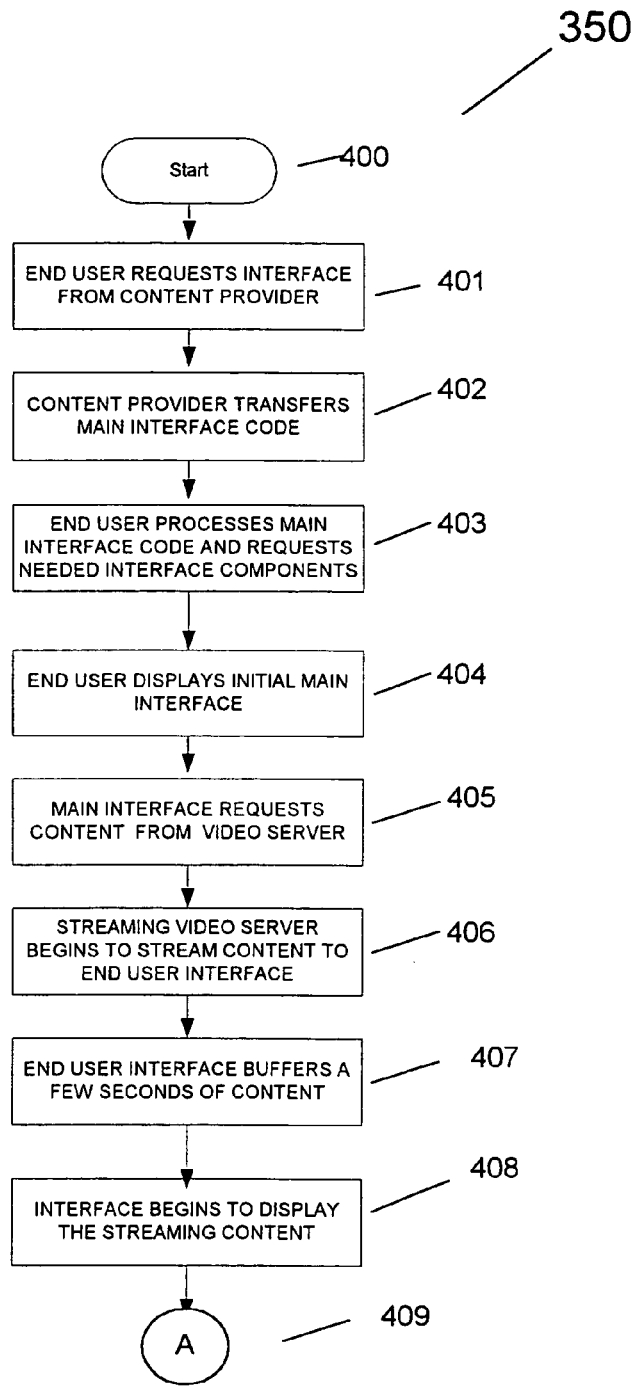
FIGS. 4-7 are control flow diagrams of a method executable by the software and hardware illustrated in FIGS. 1 and 2 according to an embodiment of the present invention.

After user interface client 205a is downloaded to processing device 101 from processing device 102, a user interface display 300 is provided on processing device 101 as illustrated in FIG. 3. User interface display 300 is provided by processing device 102 downloading content, and in particular, a dynamic hypertext mark up language ("DHTML") page to processing device 101. Browser 204 reads the DHTML page and requests the rest of user interface client 205a from content server 209. Content server 209 is a software program which provides information, such as a DHTML page, to processing devices requesting such information. User interface client 205a in an embodiment of the present invention includes: a) HTML tags and text; b) images in a GIF and/or JPEG file format; c) JAVA script; and d) references to objects, such as an address to object 210 in data store 103.

FIG. 3 illustrates a user interface display 300 at processing device 101. User interface display 300 includes windows 301, 302 and 303. In addition, user interface display 300 includes controls 307, such as play, pause, stop, rewind, forward, volume, mute and display size control buttons. In an embodiment of the present invention, window 301 provides video 304, such as video of a room. Window 302 includes a high resolution image 305, such as an image of a chair for sale, and window 303 includes text 306, such as dimensions and price of the chair.

After user interface display 300 is provided to processing device 101, user interface client 205a requests media from media processing device 104. Media may include audio, video or combination thereof. In an embodiment of the present invention, video is provided to window 301 from media file 201 stored in processing device 104. As described in detail below, media file 201 is provided by streaming video server 200. As video 304 is provided to processing device 101, user interface client 205a detects an embedded code, and in particular, a metadata time code 203. Generally, the user interface client 205a spawns a CGI process which is used to access object 210 in data store 103. Information in object 210 is then used to update user interface display 300 in an embodiment of the present invention. For example, object 210 may include rules to display high resolution image 305 in window 302 or provide text, such as a price in window 303.

In an embodiment of the present invention, electronic representations of high resolution image 305 and text 306 (price) are stored as files 305a and 306a in data store 103. In alternate embodiments, object 210 may implement other actions. For example, object 210 may include code to display a web page or code to be executed.

The end user also has the ability to interactively change the contents of user interface display 300. The user may click the DHTML driven buttons in controls 307.

Multimedia file 201 in an embodiment of the present invention is a digitized format of video. In an embodiment, video footage is captured using a video work station such as a Media 100, Inc., located in Marlbor, Mass., Matrox's Digisuite, located in Borval, Canada, or Pinnacle System's DV500, located in Mountain View, Calif. Media file 201 is a compressed file in an embodiment of the present invention.

The embedded code of media file 201 may be indexed using a variety of technologies. For example, if media file 201 is an .ASF file, Stream Anywhere, available from Sonic Foundry, located in Madison, Wis., inserts code 203 at predetermined set intervals in order to alter user interface display 300. In an embodiment of the present invention, media file 201 may include a plurality of codes 203 at predetermined time intervals. The format of metadata time code 203 may include, for example, "Frame4.cgi?WebID=1234567&&frame3".

The time code includes a number of fields to be parsed and processed. For example, "Frame4.cgi" represents an address of a CGI process which will process the time code information. The CGI process may be located in CGI 208. "?" identifies that the following field is a variable to be passed to the CGI process. "1234567" is a unique time index number used by the CGI process. "&&" identifies that the following information is the target address or destination of the information obtained by the CGI process. For example, "frame3" identifies that the CGI process should display information such as chair image 305 in window 302 illustrated in FIG. 3.

User interface client 205, in an embodiment of the present invention, uses Active X Com objects to encrypt and access data store 103. The user interface client 205a and Active X Com objects are programmed using Microsoft's Visual Basic according to an embodiment of the present invention. Some functions used in interface client 205a exist in the data store as stored procedures. This was done to gain optimum performance of the data for access as known in the art. The complete functionality of the video index GUI is to keep the metadata time code commands in a manageable real-time environment.

FIGS. 4-7 are control flow diagrams of a method 350 executed by software, hardware, or a user, singly or in combination thereof, illustrated in FIGS. 1 and 2 according to an embodiment of the present invention. FIGS. 4-7 illustrate a sequence of logic steps represented by logic blocks. In alternative embodiments of the present invention, additional logic blocks may be included and illustrated logic blocks may be omitted.

The method 350 initiates as illustrated by logic block 400. An end user requests a user interface client 205 from content server 209 stored on processing device 102 as illustrated by logic block 401. Content server 209 then transfers the user interface client 205a to processing device 201 as illustrated by logic block 402. User interface client 205 then requests interface components such as images and code to display initial user interface as illustrated by logic block 403a. User interface display is then displayed as illustrated by logic block 404. For example, user interface display 300 as illustrated in FIG. 3 is provided to end user processing device 101. User interface client 205a then requests media from streaming media server 200 on media processing device 104 as illustrated by logic block 405. Streaming video server 200 then begins to provide video to end user interface client 205a stored in end user processing device 101 as illustrated by logic block 406. In an embodiment of the present invention, end user interface client 205a buffers streaming media for a few seconds as illustrated by logic block 407. Video such as video 304 in FIG. 3 is then provided in window 301 as illustrated in FIG. 3 and described in logic block 408.

Figure 5:
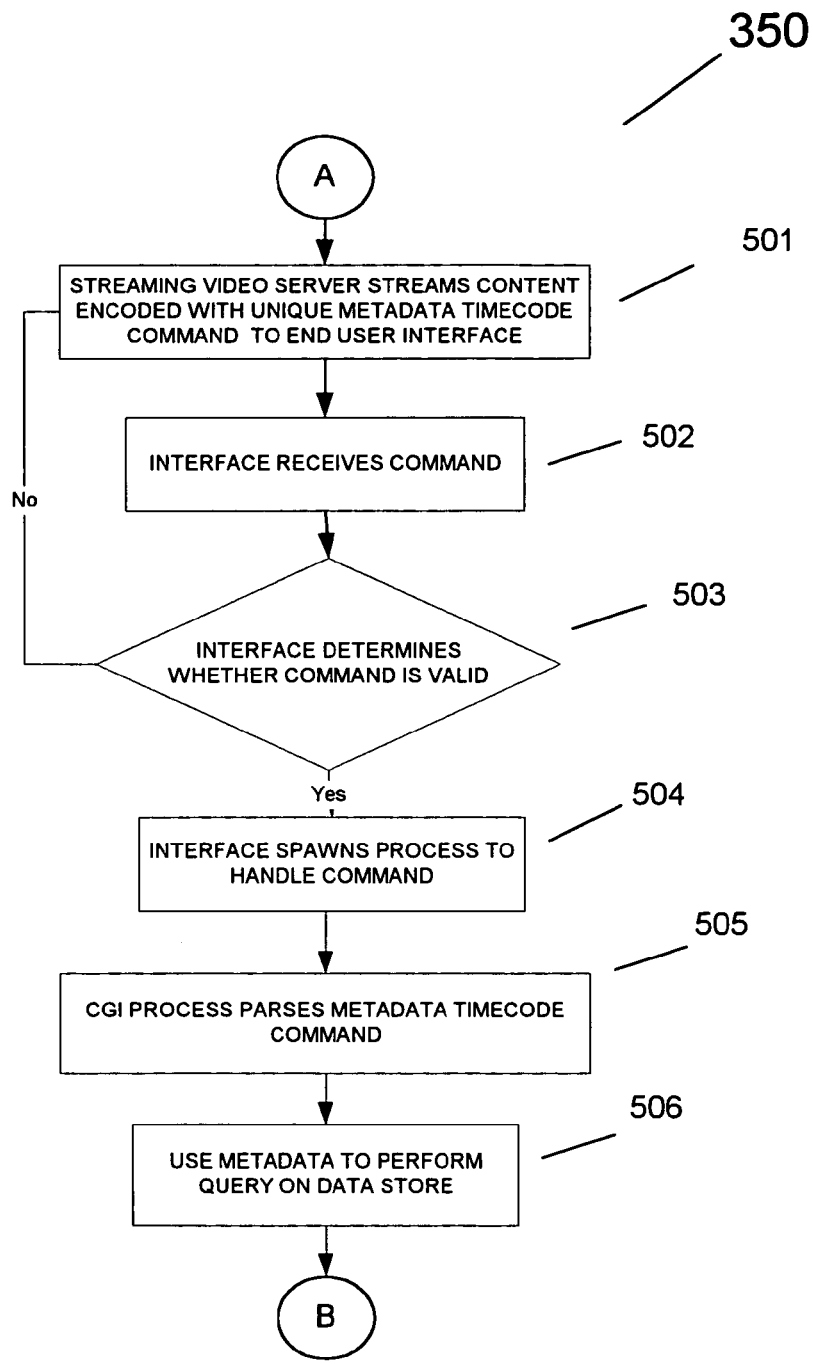

A unique embedded code in media file 201 or metadata time code 203 is then provided by streaming video server 200 and media processing device 104 and as illustrated in logic block 501 of FIG. 5. User interface client 205a then receives the code 203 as illustrated by logic block 502. Interface client 205a then determines whether code 203 is a valid command as illustrated by logic block 503. If the code 203 is not a valid command, logic transitions back to logic block 501. If the command is valid, interface client 205a spawns a process to handle the command in code 203 as illustrated by logic block 504. In an embodiment of the present invention, interface client 205a spawns a CGI process. The CGI process parses the metadata time code command 203 as illustrated by logic block 505. A segment of the code 203 is then used to perform a query on data store 103. In an embodiment of the present invention, a segment of code 203 is used in an SQL query to a relational database in data store 103. In an embodiment of the present invention, the query determines the contents of object 210 in data store 103. Object 210 may include rules for updating user interface display 300. For example, object 210 may include rules for displaying image 305 and text 306.

Data store 103 receives a command from CGI process as illustrated in logic block 604. The commands could include an SQL query or update command. A determination is then made by the data store whether or not the command is recognized as illustrated in logic block 606. If the data store recognizes the command, control transitions to logic block 607 where the data store searches for the results based on the command. Otherwise, logic transitions to logic block 610 where the data store returns a negative result and control then passes to logic block 611. If control transitions from logic block 607, a determination is made whether data search is positive as illustrated by logic block 608. If the data store search is not positive, control transitions to logic block 610. Otherwise, control transitions to logic block 609. The data store returns a positive search result as illustrated by logic block 609. These results could include software code or images. The result of the command is then returned to the CGI process as illustrated by logic block 611. A determination is made whether the CGI process updates the interface in logic block 507. Logic block 509 represents the CGI process action which is used to update user display interface 300. If the CGI process does not change user interface display, logic transitions to logic block 508.

Figure 6:
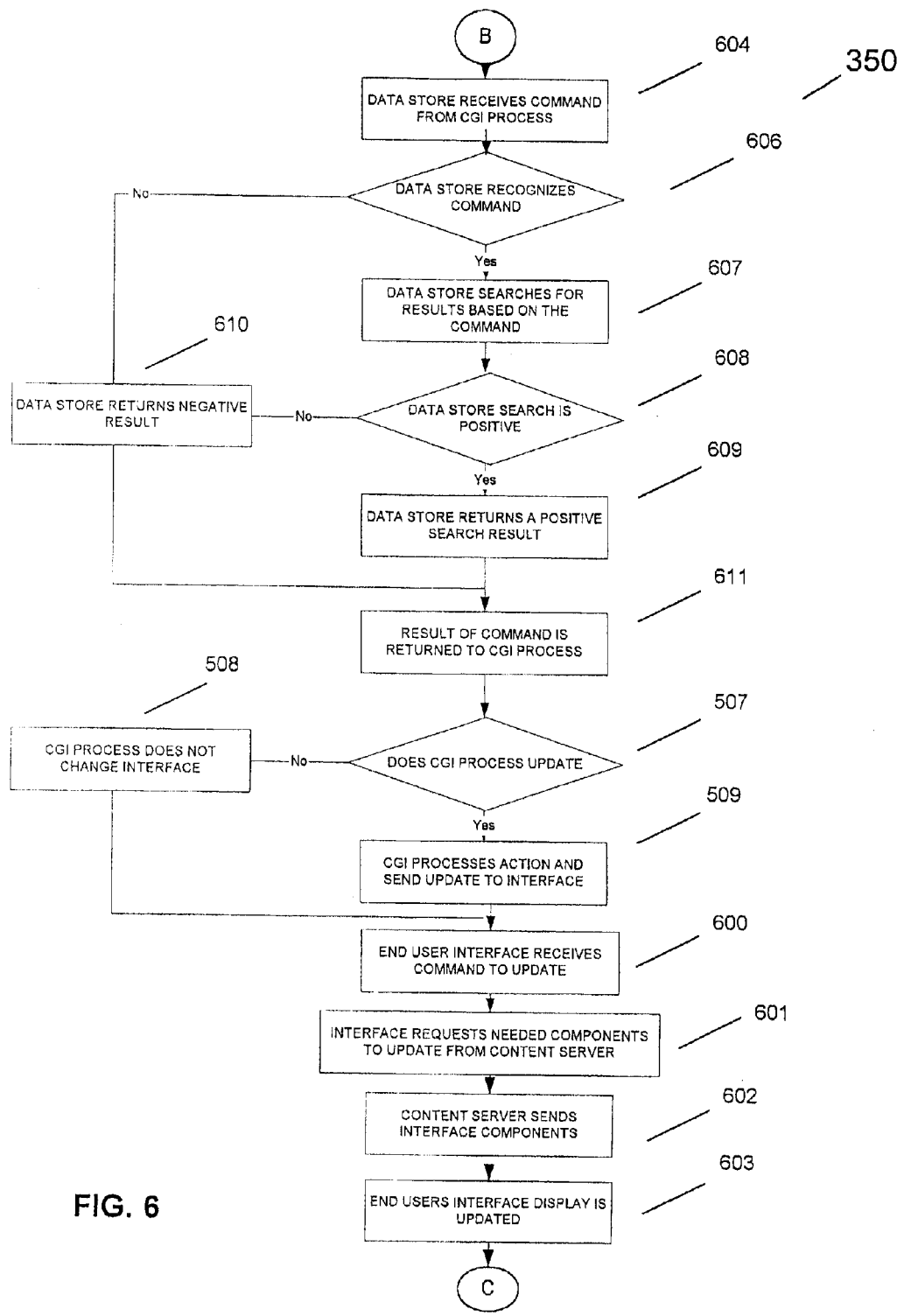

User interface client 205a then receives the command from CGI process to update user interface display 300 as illustrated by logic block 600 in FIG. 6. User interface client 205a then requests needed components, such as an image, to update user interface display 300 from content server 209 as illustrated by logic block 601. Content server 209 then sends user interface client 205 the needed components, such as images or code, as illustrated by logic block 602. The end user interface display 300 is then updated as illustrated by logic block 603.

Figure 7:
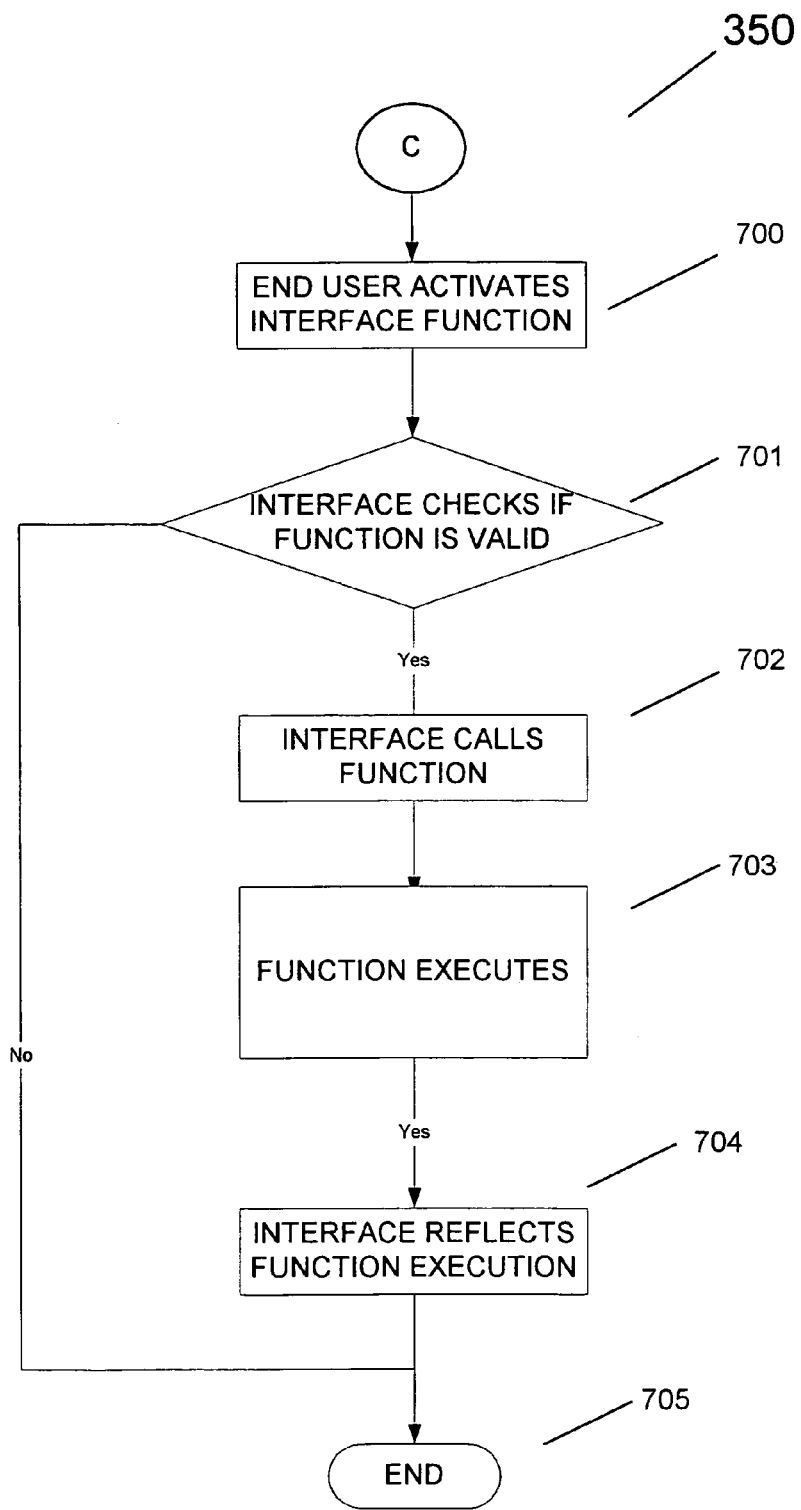

FIG. 7 illustrates a control flow diagram for the operation of control functions 307 illustrated in FIG. 3. An end user activates an interface function such as a play button in control buttons 307 as illustrated by logic block 700. Interface client 205a then checks if the function is valid as illustrated by logic block 701. If the function is not valid, the logic transitions to the end 705. Otherwise, the user interface client 205a calls the function as illustrated in logic block 702. These functions include: playing the video, pausing the video, stopping the video, rewinding the video, fast forwarding the video, increasing volume, decreasing volume, muting volume and increasing display size. The function then executes as illustrated by logic block 703. Interface then reflects the function execution as illustrated in logic block 704 and control ends as illustrated by logic block 705.

While certain preferred embodiments of the invention have been described, these embodiments have been presented by way of example only, and are not intended to limit the scope of the present invention.

Although the present invention solves the problem of providing a real time interactive dynamic user interface with streaming content, its possible implementations are not limited to this. Using similar systems and methods described herein, the streaming content unique time code can be easily integrated into various other solutions. e.g. e-commerce systems, enterprise resource planning systems, and any other real time database driven systems.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for obtaining streaming content from a processing device network, comprising:

requesting an interface program from a first processing device in the processing device network;

downloading the interface program to a second processing device in the processing device network;

displaying a user interface on a display of the second processing device;

requesting by the interface program a streaming media file from a third processing device on the processing device network;

downloading the streaming media file to the second processing device, wherein the streaming media file includes an embedded code;

detecting the embedded code that includes information that represents an address to a remote common gateway interface process;

spawning the remote common gateway interface process that retrieves an object from a data store in response to the information that represents the address to the remote common gateway interface process;

parsing the embedded code into a plurality of code segments by the remote common gateway interface process;

querying a memory location in the data store responsive to a code segment in the plurality of code segments; and, responding to the object including rules in the memory location, wherein the displayed user interface includes at least a first window and a second window, wherein the embedded code is a metadata time code having a format of the address to the remote common gateway interface process, a variable and a target destination, and wherein the common gateway interface process uses the variable to provide content to the first window identified by the target destination.

2. The method of claim 1, wherein the rules include updating the displayed user interface with a high resolution image stored in the data store and providing video responsive to the streaming media file.

3. The method of claim 1, wherein the first processing device and the second processing device are different process devices.

4. The method of claim 1, wherein the second processing device is a personal computer having a web browser.

5. The method of claim 1, wherein the second processing device is a box coupled to a television.

6. The method of claim 1, wherein the streaming media file is a advanced streaming format (.ASF) file.

7. The method of claim 1, wherein the streaming media file is a real network media (.RM) file.

8. A method of claim 1, wherein the third processing device is a media server.

9. The method of claim 1, wherein the downloading step includes buffering a portion of the streaming media file.

10. The method of claim 1, wherein the responding step includes updating the user interface display.

11. The method of claim 1, further comprising changing an object, image, text and/or multimedia file in the data store while leaving the embedded code unchanged.

12. A system, comprising:
a first processing device having a web browser;
a data store to store an object; and,
a second processing device coupled to the first processing device to provide the first processing device with (1) a displayed user interface and (2) a streaming media file having an embedded code including a metadata time code having a format of a process identification, a variable and a target destination; wherein the displayed user interface detects the metadata time code during a streaming media file download to the first processing device and, wherein the displayed user interface spawns a remote common gateway interface process that parses the metadata time code the remote common gateway interface process accesses the object and uses the variable to provide content to a first window identified by the target destination in the displayed user interface while the streaming media file is used to display a video in a second window of the displayed user interface.

13. The system of claim 12, wherein the first and second processing devices are computers.

14. The system of claim 12, wherein the first processing device and the second processing device are coupled to the Internet.

15. The system of claim 12, wherein the first processing device and the second processing device are coupled to an intranet.

16. The system of claim 12, wherein an object, image, text and/or multimedia file in the data store is changed while leaving the embedded code unchanged.

17. An article of manufacture, including a computer readable memory, comprising:
a first software component to provide a streaming media file to a client;
a second software component to detect an embedded code including a metadata time code having a format of a process identification, a variable and a target destination; and
a remote common gateway interface process identified by the process identification that parses the metadata time code the remote common gateway accesses an object in a data store and uses the variable to provide content to a first window identified by the target destination in a user interface while providing video responsive to the streaming media file in a second window of the user interface.

18. The article of claim 17, wherein an object, image, text and/or multimedia file in the data store is changed while leaving the embedded code unchanged.

19. A method for providing content, comprising:
storing an object in a data store;
downloading a streaming media file having an metadata time code including a process identification to a remote common gateway interface process, a variable and a target destination;
detecting the metadata time code;
parsing the metadata time code;
passing the variable of the embedded code to the remote common gateway interface process;
retrieving the object from the data store;
downloading information, by the remote common gateway interface process using the variable and the object, to provide content to a first window identified by the target destination in a user interface while displaying video in a second window of the user interface in response to the streaming media file.

20. The method of claim 19, further comprising changing an object, image, text and/or multimedia file in the data store while leaving the metadata time code unchanged.

* * * * *